US012062802B2

(12) United States Patent
Lee et al.

(10) Patent No.: US 12,062,802 B2
(45) Date of Patent: *Aug. 13, 2024

(54) BATTERY CELL ASSEMBLY FOR SECONDARY BATTERY AND A METHOD OF MANUFACTURING THE SAME

(71) Applicant: SK Innovation Co., Ltd., Seoul (KR)

(72) Inventors: Tae Gu Lee, Daejeon (KR); O Sung Kwon, Daejeon (KR); Gyu Jin Chung, Daejeon (KR); Young Ki Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 149 days.

This patent is subject to a terminal disclaimer.

(21) Appl. No.: 17/533,378

(22) Filed: Nov. 23, 2021

(65) Prior Publication Data

US 2022/0085429 A1 Mar. 17, 2022

Related U.S. Application Data

(63) Continuation of application No. 16/694,150, filed on Nov. 25, 2019, now Pat. No. 11,196,105, which is a
(Continued)

(30) Foreign Application Priority Data

Apr. 24, 2014 (KR) ......................... 10-2014-0049595

(51) Int. Cl.
*H01M 50/211* (2021.01)
*H01M 10/48* (2006.01)
(Continued)

(52) U.S. Cl.
CPC ......... *H01M 50/211* (2021.01); *H01M 10/48* (2013.01); *H01M 10/613* (2015.04);
(Continued)

(58) Field of Classification Search
None
See application file for complete search history.

(56) References Cited

U.S. PATENT DOCUMENTS

| | | | | |
|---|---|---|---|---|
| 7,338,733 | B2* | 3/2008 | Morita | H01M 50/103 |
| | | | | 429/162 |
| 8,647,762 | B2* | 2/2014 | Schwab | H01M 10/653 |
| | | | | 206/703 |
| 11,196,105 | B2* | 12/2021 | Lee | H01M 50/258 |
| 2009/0325059 | A1* | 12/2009 | Niedzwiecki | H01M 50/211 |
| | | | | 429/152 |

(Continued)

FOREIGN PATENT DOCUMENTS

JP 11111250 A * 4/1999

OTHER PUBLICATIONS

Machine translation of the detailed description of JP 11-111250A. (Year: 2011).*

*Primary Examiner* — Gregg Cantelmo
(74) *Attorney, Agent, or Firm* — IP & T GROUP LLP

(57) ABSTRACT

Disclosed are a battery cell assembly for a secondary battery, the battery cell assembly for a secondary battery comprising: at least one battery cell; and a first frame disposed on one side of the at least one battery cell; and a second frame which is disposed on the other side of the at least one battery cell so as to face the first frame and which is coupled to the first frame so as to protect the edge of the at least one battery cell together with the first frame. The present invention uses a frame type cell support which retains and supports at least one battery cell without separation, thereby providing a battery cell assembly for a secondary battery, namely a sub-battery module receiving body, having improved structural stability and assembly convenience, and a secondary battery comprising the same.

9 Claims, 6 Drawing Sheets

Related U.S. Application Data continuation of application No. 15/305,537, filed as application No. PCT/KR2015/004034 on Apr. 23, 2015, now abandoned.

(51) Int. Cl.

| | | |
|---|---|---|
| *H01M 10/613* | (2014.01) | |
| *H01M 10/625* | (2014.01) | |
| *H01M 10/647* | (2014.01) | |
| *H01M 10/6555* | (2014.01) | |
| *H01M 10/6556* | (2014.01) | |
| *H01M 50/227* | (2021.01) | |
| *H01M 50/249* | (2021.01) | |
| *H01M 50/258* | (2021.01) | |

(52) U.S. Cl.
CPC ....... *H01M 10/625* (2015.04); *H01M 10/647* (2015.04); *H01M 10/6555* (2015.04); *H01M 10/6556* (2015.04); *H01M 50/227* (2021.01); *H01M 50/249* (2021.01); *H01M 50/258* (2021.01); *H01M 2220/20* (2013.01)

(56) References Cited

U.S. PATENT DOCUMENTS

| | | | | |
|---|---|---|---|---|
| 2012/0040222 | A1* | 2/2012 | Quick | H01M 10/6555 165/185 |
| 2012/0121963 | A1* | 5/2012 | Kwon | H01M 50/121 429/127 |
| 2013/0309542 | A1* | 11/2013 | Merriman | B23P 15/26 29/890.038 |
| 2014/0308558 | A1* | 10/2014 | Merriman | H01M 10/613 429/120 |
| 2015/0111075 | A1* | 4/2015 | Yum | H01M 50/211 429/82 |
| 2016/0126523 | A1* | 5/2016 | Arena | H01M 10/613 429/90 |

* cited by examiner

BATTERY CELL ASSEMBLY FOR SECONDARY BATTERY AND A METHOD OF MANUFACTURING THE SAME

CROSS REFERENCE TO RELATED APPLICATIONS

This application is a continuation of U.S. patent application Ser. No. 16/694,150, filed on Nov. 25, 2019, which matured into U.S. Pat. No. 11,196,105, issued on Dec. 7, 2021, which is a continuation of U.S. patent application Ser. No. 15/305,537, filed on Oct. 20, 2016, now abandoned, which is a National Phase Entry Application form PCT/KR2015/004034, filed on Apr. 23, 2015, claiming priority from Korean Patent Application No. 10-2014-0049595, filed Apr. 24, 2014, all of which are incorporated herein in their entireties by reference.

TECHNICAL FIELD

The present invention relates generally to a battery cell assembly and a method of manufacturing a battery cell assembly for secondary battery. More particularly, it relates to a battery cell assembly for a secondary battery, namely a sub-battery module having at least one battery cell, having improved structural stability and assembly convenience.

BACKGROUND ART

In general, a secondary battery is a unit that can be repeatedly charged and discharged. Such a battery has been widely used as a power source for a cellular device, an EV (electric vehicle), and a HEV (hybrid electric vehicle), etc.

In particular, a secondary battery having high output and high capacity is used in an EV, etc., which adopts a mid-to-large sized battery module. The mid-to-large sized battery module is typically a pouch type battery or a prismatic battery, and is more excellent in view of high integration and energy density characteristics per unit weight.

The mid-to-large sized battery module is comprised of a plurality of battery cells capable of being charged and discharged. Particularly, a pouch type battery is adopted for a unit cell of the mid-to-large sized battery module since the pouch type battery has advantages in that it is excellent in view of relatively low manufacturing costs, light weight, and preventing the leakage of electrolyte.

However, in the case of an above-mentioned pouch-type secondary battery in the prior art, which is in a state in which electrolyte is injected to an interior of a battery cell, when overcharging the battery cell, decomposition of the electrolyte instantly occurs due to an increase of cell voltage and overheating and inflammable gas is generated. This gas causes swelling, namely expansion of the pouch, so a short circuit of an internal electrode in which a separator between a cathode and an anode is melted, whereby the battery pack is likely to ignite. Accordingly, the conventional pouch-type secondary battery is problematic in terms of ensuring safety of the battery cell.

Further, an above-mentioned mid-to-large sized battery module includes a casing for containing the plurality of battery cells in which the battery cells are stacked, thereby supplying cell voltage or electric current having high capacity by electrically connecting electrode tabs of battery cells in series and/or parallel.

As a document of related art, Korean Patent Application Publication No. 10-2013-0005528 discloses a secondary battery including a plurality of sub-battery modules stacked on a battery module casing. The sub-battery module includes a pouch containing battery cells wherein an end portion of a sealing part of the pouch is protected by a support member. The support member covers an edge of the sealing part of the pouch and ensures a sealing state, thereby improving durability thereof. Further, the support member is engaged with the sealing part of the sub-battery module by applying a molding material on a fixing projection of the support member.

However, the conventional sub-battery module increases thickness of the sealing part of the pouch and also increases weight of the sub-battery module due to an additional support member. Further, the sub-battery module requires additional manpower for disposing the support member on the sealing part of the pouch and has a limit to secure a structural stability and a sealing stability.

DISCLOSURE

Technical Problem

Accordingly, the present invention has been made keeping in mind the above problems occurring in the related art, and the present invention is intended to propose a battery cell assembly, namely a sub-battery module, capable of protecting an edge of a pouch-type battery cell by bonding such as a welding method, etc.

Technical Solution

In order to achieve the above object, according to one aspect of the present invention, there is provided a battery cell assembly for a secondary battery, the assembly including: at least one battery cell; a first frame provided on an edge of a first surface of the at least one battery cell; and a second frame provided on an edge of a second surface of the at least one battery cell so as to face the first frame, in which the first frame and the second frame are in surface contact with each other.

Preferably, the first frame and the second frame may be made of plastic that is able to be easily bonded together.

In the embodiment of the present invention, the first frame may be provided with a first seating part, a first bending part that protrudes on an edge of the first seating part in a direction perpendicular to the first frame, and a first bonding part that extends from the first bending part towards outside of the first frame in a direction perpendicular thereto. Further, the second frame may be provided with a second seating part, a second bending part that protrudes on an edge of the second seating part in a direction perpendicular to the second frame, and the second bonding part that is extending from the second bending part towards outside of the second frame in a direction perpendicular thereto.

In particular, in an embodiment of the present invention, the first bonding part and the second bending part may be in surface contact with each other so as to contain and support the battery cell therein.

Further, the first seating part may be provided with a first window at a center inside thereof. The first window may play a roll of exposing a part of the battery cell and accommodating a cell body part of the battery cell.

The first bonding part of the present invention may be provided with a first stepped portion that is formed on a junction between the first bonding part and the first bending part.

In addition, the first bonding part may be provided with a protrusion that protrudes in a direction perpendicular thereto.

Furthermore, the second seating part may be provided with a second window at a center inside thereof.

The second bonding part of the present invention may be provided with a second stepped portion that is formed on a junction between the second bonding part and the second bending part.

In addition, the second bonding part may be provided with a groove that is indented in a direction perpendicular thereto. The groove of the second bonding part may be formed at a location corresponding to the protrusion and fixes the first frame and the second frame together by force fitting.

The first bonding part and the second bonding part may be coupled to each other by bonding such as a welding method, etc. In other words, the first bonding part and the second bonding part may be packaged by the welding method instead of a bolt and nut engagement. Selectively, laser welding may be used as the welding method.

Further, the present invention may fix the first bonding part and the second bonding part together by thermal fusing or bonding.

A preferred embodiment of the present invention may be configured to additionally place a heat dissipation plate between one or more battery cells so as to quickly radiate heat generated in the battery cells. Further, the heat dissipation plate may be provided with a refrigerant tube that is provided along an edge of the heat dissipation plate and guides a refrigerant. The edge of the heat dissipation plate may be placed between the first stepped portion and the second stepped portion and enables the heat dissipation plate to be fixed.

In addition, the heat dissipation plate may be made of aluminum for prompt heat exchange.

Advantages and features of the present invention will be clear with reference to an exemplary embodiment described in detail below together with the accompanying drawings.

First of all, terms or words used in the specification and the claims should not be interpreted as having a general dictionary meaning and should be interpreted as having a meaning and a concept that conform to the technical spirit of the present disclosure based on a principle that an inventor can appropriately define a concept of a term in order to describe his/her own disclosure by the best method.

Advantageous Effects

According to the present invention having the above-described characteristics, it is possible to provide a battery cell assembly for a secondary battery, namely a sub-battery module, having improved structural stability and assembly convenience by using a frame type cell support that contains and supports at least one battery cell without allowing movement of the battery cell, and a secondary battery comprising the same.

The frame type cell receiving body is configured to include a first frame and a second frame that are disposed to face each other so as to fix an edge of the at least one battery cell, and are bonded to each other by a welding method, etc., wherein the frame type cell receiving body covers a single-layer battery cell or a multi-layer battery cell and protects the edge of the battery cell, whereby structural stability and assembly convenience of the battery cell assembly are improved.

In comparison with a method using an I-shaped support member provided in each of the edge of a first and a second side of a battery cell assembly or a method of fastening using nut and bolt in the prior art, the present invention forms a frame type battery cell by surface bonding such as a welding method, thereby ensuring a reliable engagement while reducing thickness of the edge of the battery cell assembly, and significantly reducing requirement of additional manpower for manufacturing the battery cell assembly.

Further, the present invention closely stacks one or more battery cells by a first frame and a second frame coupled to each other by a method of welding or thermal fusing. Specifically, the present invention stacks and accommodates one or more battery cells, preferably two or more layers of batteries between the first frame and the second frame coupled to each other by the method of welding or thermal fusing. Thus, the present invention can reliably bond and fix the edge of the battery cell regardless of a swelling phenomenon of the battery cell or external shock.

DESCRIPTION OF DRAWINGS

The above and other objects, features and other advantages of the present invention will be more clearly understood from the following detailed description when taken in conjunction with the accompanying drawings, in which.

BEST MODE

Figure 1:
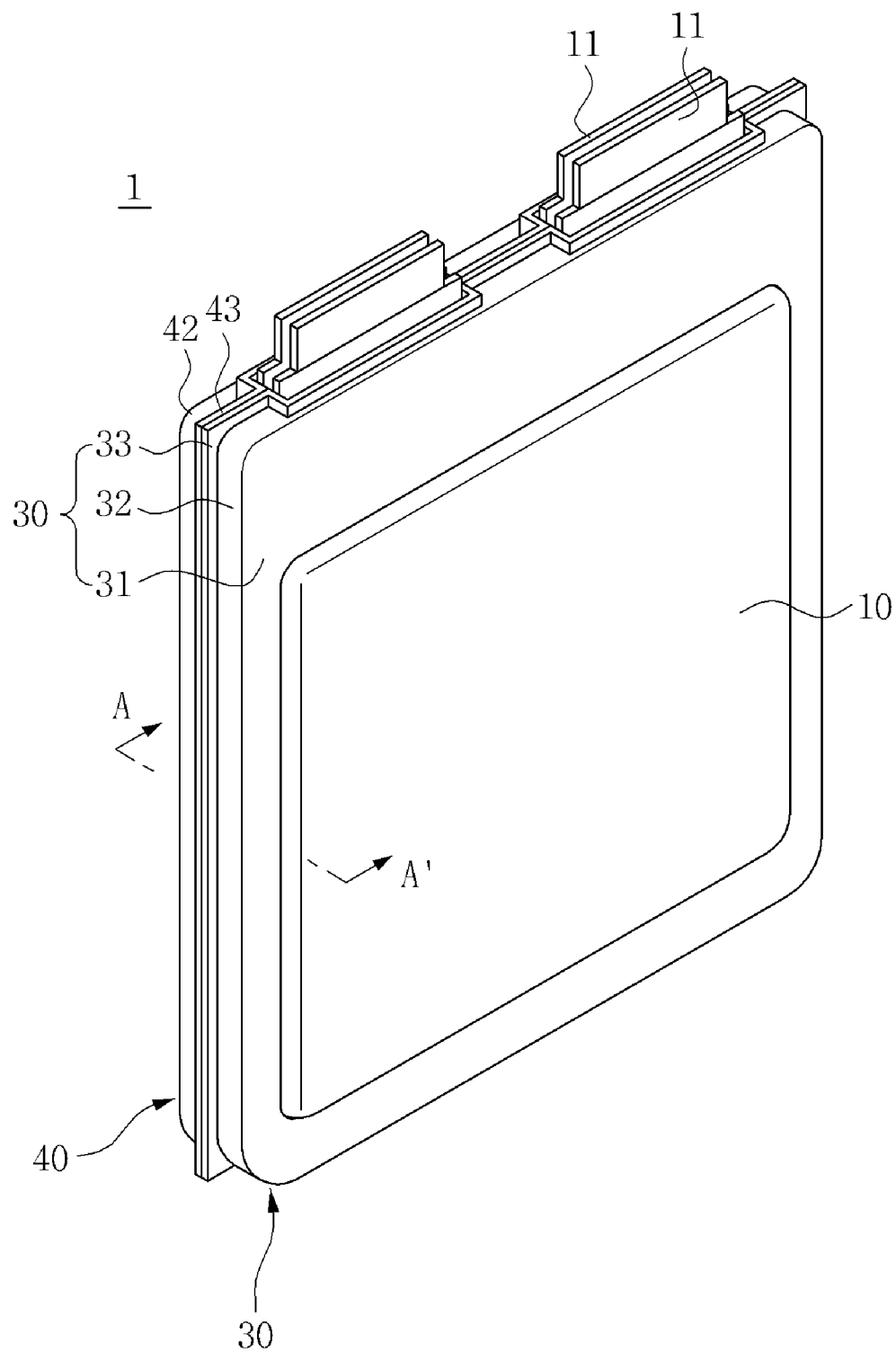
FIG. 1 is a perspective view schematically showing a battery cell assembly for a secondary battery according to a preferred embodiment of the present invention.

The advantages and features of the present invention as well as methods of realizing the advantages and features will be more apparent from embodiments to be described below in conjunction with the accompanying drawings.

Throughout this document, reference should be made to the drawings, in which the same reference numerals and symbols will be used throughout the different drawings to designate the same or like components. In the following description, detailed descriptions of known functions and components incorporated herein will be omitted in the case that the subject matter of the present disclosure may be rendered unclear thereby.

Figure 2:
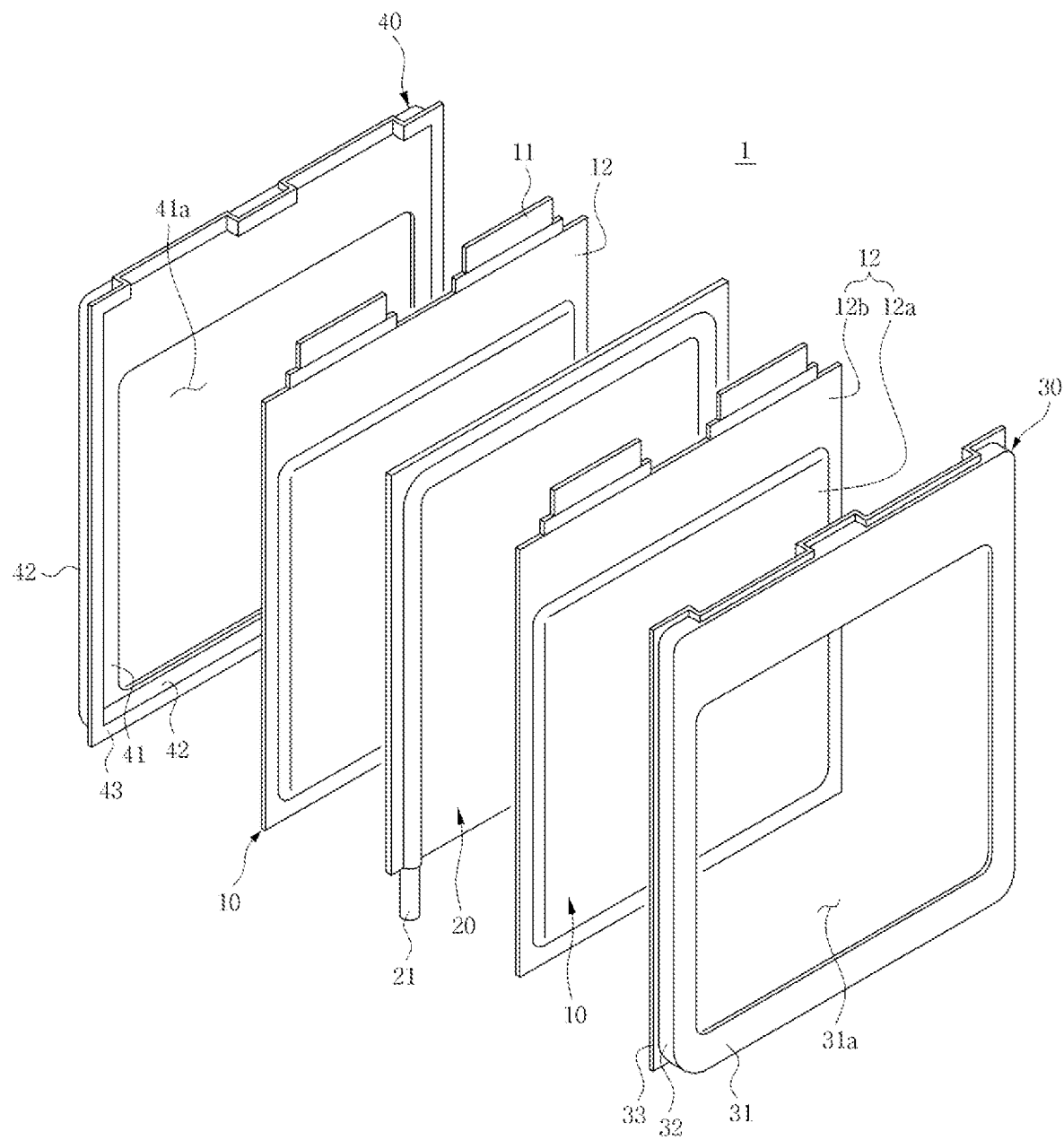
FIG. 2 is an exploded perspective view showing the battery cell assembly of FIG. 1.

First of all, referring to FIGS. 1 and 2, a battery cell assembly 1 according to an embodiment of the present invention is provided with a frame type cell receiving body that retains at least one battery cell 10 and fixes an edge of the battery cell 10. In the embodiment of the present invention, the battery cell assembly 1 forms a sub-battery module by the frame type cell receiving body.

The frame type cell receiving body as a casing type that protects an edge of the at least one battery cell is provided with a first frame 30 provided on a first side of the at least one battery cell 10 and a second frame 40 provided on a second side of the battery cell 10.

The first frame 30 and the second frame 40 are coupled to each other and form a frame fixing an edge of the battery cell 10, namely an edge of the battery cell assembly. In other words, the first frame 30 and the second frame 40 form a casing that contains and protects the at least one battery cell 10.

Further, the first frame 30 and the second frame 40 may have one battery cell 10 therebetween, and referring to FIG. 2, may have two or more battery cells 10, in other words multi-layered battery cells 10, stacked in a front-rear direction therebetween. When the first frame 30 and the second frame 40 have a plurality of battery cells 10 therebetween, the first frame 30 supports an edge of a front surface of a battery cell 10 disposed at the most front side among the plurality of battery cells 10 in a rear direction. Contrarily, the second frame 40 supports an edge of a rear surface of the battery cell 10 disposed at the most front side among the plurality of battery cells 10 in a front direction.

When calling one or more battery cells as a cell unit, the first frame 30 supports the edge of a front surface of the cell unit, and the second frame 40 supports the edge of a rear surface of the cell unit.

More specifically, the battery cell assembly 1 according to the embodiment of the present invention includes: at least one battery cell 10; a heat dissipation plate 20 placed on the battery cell 10 so as to be layered on a surface of the battery cell 10; a first frame 30 provided on a first side (a front side) of the battery cell 10, namely a cell unit, and which supports an edge of a first surface (a front surface) of the battery cell 10; and a second frame 40 provided on a second side of the cell unit supports an edge of a second surface (a rear surface) thereof, in which the first frame 30 and the second frame 40 are in surface contact with each other while facing each other.

As shown in FIGS. 1 and 2, the battery cell 10 as a pouch type battery cell enclosed with an aluminum laminated sheet is accommodated and protected against external shocks by the first frame 30 and the second frame 40.

The battery cell 10 includes: an electrode assembly (not shown); an electrode tab 11 extending from the electrode assembly in a first direction; and a pouch 12 forming a space to accommodate the electrode assembly and sealing the electrode assembly while exposing the electrode tab 11 to the outside of the electrode assembly. Preferably, an aluminum laminated sheet may be used in the pouch 12. Further, as generally known, the electrode assembly may be a stack type electrode assembly having a structure in which positive and negative electrodes are stacked with a separation membrane therebetween, or may be a jelly-roll type electrode assembly having a structure in which positive and negative electrodes are rolled with a separation membrane therebetween. However, the electrode assembly of the present invention is not limited to a specific type.

The electrode assembly is sealed inside of the battery cell 10 in a state in which the electrode assembly is accommodated in the pouch 12. The pouch 12 includes: a cell body part 12a that is thicker than an edge of the pouch 12 due to the electrode assembly disposed at a center inside of the battery cell 10; and a cell edge part 12b forming the edge of the pouch 12.

Further, the heat dissipation plate 20 includes a thermal conductive plate stacked on the battery cell 10 to cool down heat generated due to charging/discharging of the battery cell 10. The thermal conductive plate comes into close contact with a surface of the battery cell 10. More preferably, a refrigerant tube 21 is provided along an edge of the heat dissipation plate 20 and guides cooling fluid, namely a refrigerant, in the embodiment of the present invention. The refrigerant tube 21 is placed along three surfaces of the heat dissipation plate 20 in a U-shape, but is not limited to above-mentioned arrangement and shape of the refrigerant tube 21. Meanwhile, the refrigerant tube 21 may be integrally formed with the heat dissipation plate 20.

As shown in the drawings of the present invention, the heat dissipation plate 20 is placed between a pair of battery cells 10 and quickly transfers heat generated in the battery cells 10 to the outside thereof.

In order to form a thin battery cell assembly 1, the battery cell assembly 1 according to the embodiment of the present invention provides an arrangement wherein the pair of battery cells 10, particularly the cell body parts 12a, and the refrigerant tube 21 may be disposed to avoid overlapping each other. To this end, the refrigerant tube 21 may be formed larger in width than the cell body part 12a of the battery cell 10 and may be disposed along the edge of the heat dissipation plate 20 to enclose the cell body part 12a of the battery cell 10.

Accordingly, the refrigerant tube 21 wherein the refrigerant flows induces heat exchange by using the refrigerant and quickly cools down the battery cell 10. Here, the refrigerant as cooling fluid may be a vapor or cooling water, etc., but is not limited thereto.

Figure 4:
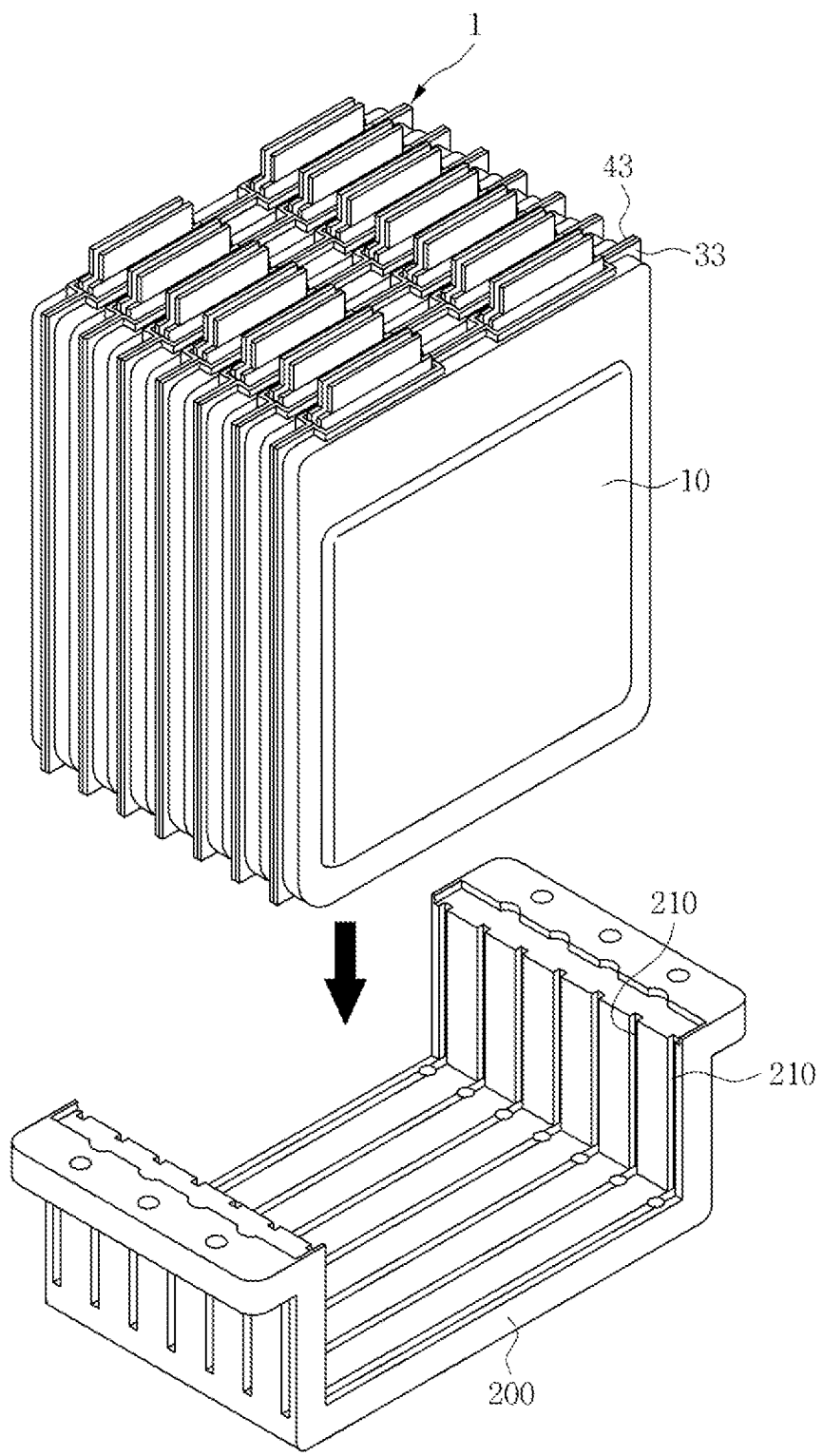
FIG. 4 is an exploded perspective view showing a battery module in which the battery cell assemblies of FIG. 1 are stacked.

Further, an inlet and an outlet of the refrigerant tube 21 are connected to an inlet port and an outlet port perforated in a battery base 200 shown in FIG. 4 to be able to communicate therebetween and efficiently control supply and drain performances of the refrigerant.

In the battery cell assembly 1 according to the embodiment of the present invention, a pair of battery cells 10 may be stably contained and supported inside of the battery cell assembly 1 by coupling the first frame 30 with the second frame 40. Of course, the above-mentioned heat dissipation plate 20 may be provided inside of the first frame 30 and the second frame 40, particularly between the pair of battery cells 10.

As described above, the first frame 30 and the second frame 40 that are coupled to each other accommodate the at least one battery cell 10 by forming a frame type support, namely a frame type cell receiving body, and protects the edge of the battery cell 10.

Specifically, the first frame 30 includes a seating part 31, a bending part 32, and a bonding part 33. In the embodiment of the present invention, the first frame 30 forms a square frame corresponding to the shape of the battery cell 10. Meanwhile, in the following description, for the convenience of description of the present invention, the seating part 31, the bending part 32, and the bonding part 33 of the first frame 30 will be referred to as "a first seating part", "a first bending part", and "a first bonding part", respectively, wherein the first seating part 31 forms a square frame.

Preferably, the first seating part 31, the first bending part 32, and the first bonding part 33 may be formed as a single integral body.

As described above, the first seating part 31 has a square frame shape to correspond to the shape of an outer portion of the battery cell 10, with a window 31a being formed in the first seating part 31. Here, the window 31a of the first seating part 31 will be referred to as "a first window" wherein the first window 31a exposes a first side of the at least one battery cell 10 to the outside. Accordingly, in the embodiment of the present invention, the first window 31a may be formed larger than the cell body part 12a so that the cell body part 12a is inserted into the first window 31a.

The first bending part 32 extends from the first seating part 31 towards the second frame 40, namely a rear side, wherein the first side of the battery cell 10 is seated in the first seating part 31. Furthermore, the first bonding part 33 extends laterally from the first bending part 32 towards the outer portion of the battery cell 10. In other words, the first bonding part 33 forms a flange, and the edge of the first frame 30 has a stepped shape.

In the embodiment of the present invention, the first bending part 32 protrudes at an edge of the first seating part 31 in a direction of a predetermined degree angle, namely a direction perpendicular to a first bonding part 33, and connects the first bonding part 33 and the first seating part 31 to each other. Accordingly, the first bending part 32 provides a predetermined distance between the first seating part 31 and the first bonding part 33.

Moreover, the first bonding part 33 is exposed outwardly in a direction parallel to the first seating part 31 or in a direction perpendicular to the first bending part 32 wherein a second bonding part 43 is fixed to the first bonding part 33 by a method of thermal fusing, welding or bonding. As shown in FIG. 2, the first bonding part 33 and the second bonding part 43 are bonded to each other to form the edge of the battery cell assembly 1. The edge of the battery cell assembly 1 is seated in a slot of the battery base 200 (see FIG. 4) by forcible fitting.

The first window 31a that functions as a through hole outwardly exposes a surface of the at least one battery cell 10. Specifically, the first window 31a outwardly exposes a predetermined portion of the battery cell 10, for example, the cell body part 12a, and plays a roll of dissipating heat generated from the battery cell 10, thus an operator can directly check the at least one battery cell 10 by naked eye. On this account, the operator can easily observe a swelling phenomenon of the battery cell 10, thereby quickly replacing a battery cell assembly 1 having the swelling battery cell with a new one and thus preventing unnecessary damage to an adjacent battery cell assembly 1 and lengthening the lifetime of a battery module.

Next, the second frame 40 includes a seating part 41, a bending part 42, and a bonding part 43. In the embodiment of the present invention, the second frame 40 forms a square frame to correspond to the shape of the battery cell 10. Meanwhile, in the following description, for the convenience of description of the present invention, the seating part 41 will be referred to as "a second seating part"; the bending part 42 will be referred to as "a second bending part"; and the bonding part 43 will be referred to as "a second bonding part". Here, the second seating part 41, the second bending part 42, and the second bonding part 43 may be formed as a single integral body.

In the embodiment of the present invention, the second seating part 41 substantially forms a square frame wherein a second window 41a is formed. Further, the second window 41a has a size capable of accommodating the cell body part 12a of the battery cell 10.

The second bending part 42 extends from the second seating part 41 towards the first frame 30, namely a front side, wherein the other side of the at least one battery cell 10 is seated in the second seating part 41. Further, the second bonding part 43 extends laterally from the second bending part 42 towards an outer portion of the battery cell 10. In other words, the second bonding part 43 forms a flange and the edge of the second frame 40 has a stepped shape.

In the embodiment of the present invention, the second bending part 42 forwardly protrudes at an edge of the second seating part 41 in a direction of a predetermined degree angle, namely a direction perpendicular to the second bonding part 43, and connects the second bonding part 43 and the second seating part 41. Accordingly, the second bending part 42 provides a predetermined distance between the second seating part 41 and the second bonding part 43.

The second bonding part 43 is outwardly exposed in a direction parallel to the second seating part 41 or in a direction perpendicular to the second bending part 42 wherein the first bonding part 33 of the first frame 30 is fixed to the second bonding part 43 by a method of thermal fusing or welding. Preferably, as described above, the first bonding part 33 of the first frame 30 and the second bonding part 43 of the second frame 40 may be made of plastic so as to be easily bonded together. Of course, when coupling the first bonding part 33 to the second bonding part 43 by laser welding, the two parts 33 and 43 are required to be made of the same material in consideration of thermal expansion and uniformity.

Further, the second window 41a functions as a through hole that outwardly exposes a surface of the at least one battery cell 10 wherein the second window 41a outwardly exposes a predetermined portion of the battery cell 10, for example, the cell body part 12a, and plays a roll of dissipating heat generated from the battery cell 10 and enabling an operator to directly check the battery cell 10 by naked eye.

According to the embodiment of the present invention, the first bonding part 33 and the second bonding part 43 may be bonded together by laser welding. As widely known in the prior art, laser welding has advantages in reducing damage of parts with high energy density and improving strength between the first frame 30 and the second frame 40 with high welding quality. Further, in comparison with the conventional method of fastening using nut and bolt, since the first bonding part 33 of the first frame 30 and the second bonding part 43 of the second frame 40 are bonded together by laser welding, which decreases stress acting in a junction therebetween, the reliability of supporting the battery cell 10 is increased. Of course, the laser welding for a battery cell assembly 1 according to the embodiment of the present invention may be substituted for bonding or thermal fusing.

Figure 3:
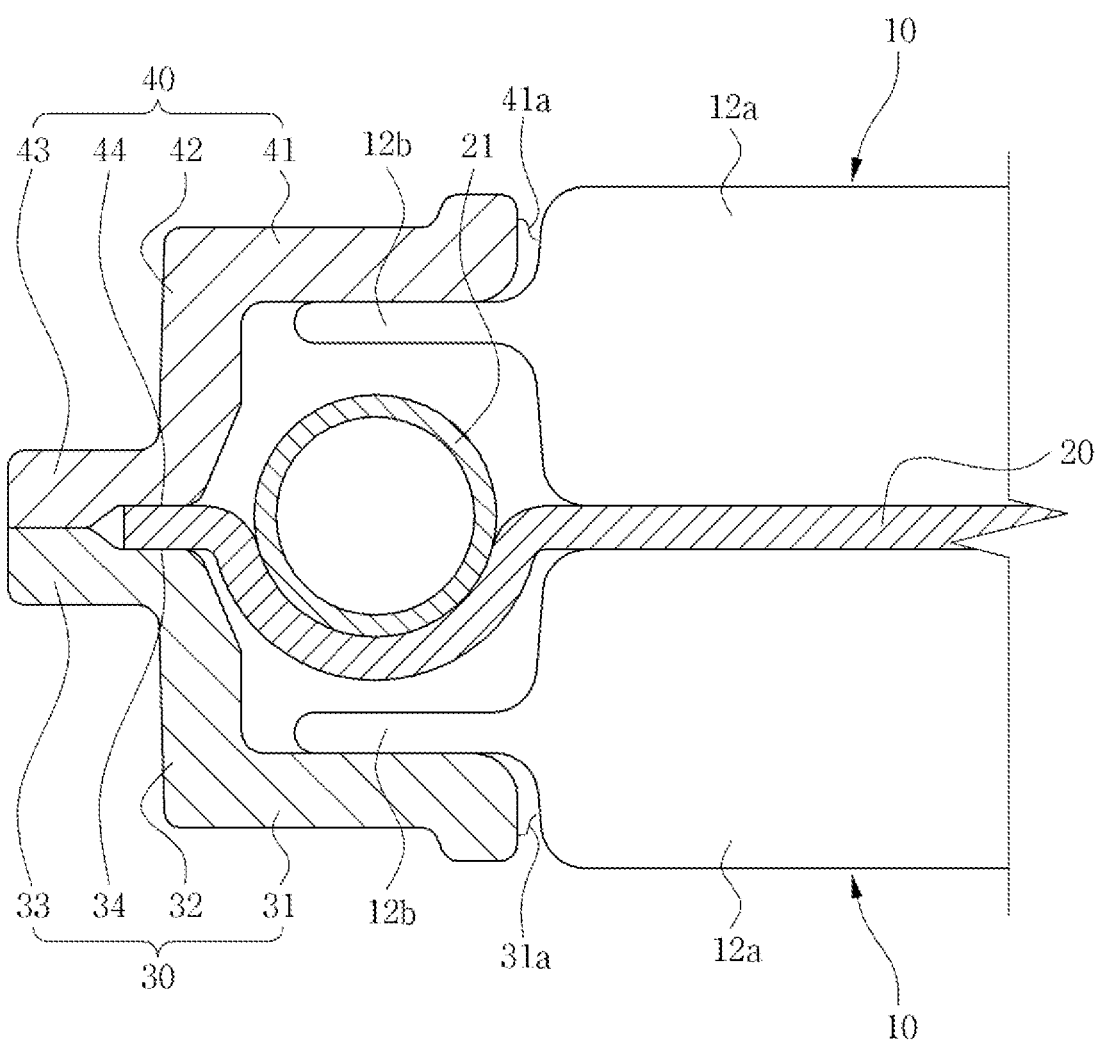
FIG. 3 is a partial cross-sectional view taken along line A-A' of FIG. 1.

FIG. 3 is a partial cross-sectional view taken along line A-A' of FIG. 1. As shown in FIG. 3, the battery cell assembly 1 provides an arrangement wherein the first bonding part 33 of the first frame 30 and the second bonding part 43 of the second frame 40 are reliably bonded together by a bonding method such as laser welding, etc., and fix a heat dissipation plate 20 placed between a pair of battery cells 10 at a position without allowing movement of the heat dissipation plate 20.

The first frame 30 may be formed with a size and shape capable of accommodating the battery cell 10. Likewise, the second frame 40 may be formed with a size and shape capable of accommodating the battery cell 10.

The first bonding part 33 may include a first stepped portion 34 formed at a junction between the first bonding part 33 and the first bending part 32. Of course, the first stepped portion 34 may be formed on a circumference of the first bending part 32 along a surface of the first bonding part 33.

On the contrary, the second bonding part 43 may include a second stepped portion 44 formed at a junction between the second bonding part 43 and the second bending part 42. Here, the second stepped portion 44 may be formed on a circumference of the second bending part 42 along a surface of the second bonding part 43.

As shown in FIG. 3, the first stepped portion 34 and the second stepped portion 44 disposed opposite to each other form a space part therebetween wherein an edge of the heat dissipation plate 20 is accommodated, such that the heat dissipation plate 20 can be firmly fixed by coupling of the first frame 30 and the second frame 40.

The refrigerant tube 21 of the heat dissipation plate 20 is disposed in an inner space formed by the welding of the first bending part 32 of the first frame 30 and the second bending part 42 of the second frame 40, so the refrigerant tube 21 avoids affecting the thickness of the battery cell assembly 1. Preferably, the heat dissipation plate 20 and the refrigerant tube 21 may be made of aluminum that enables quick heat exchange.

Further, the first seating part 31 is in contact with the cell edge part 12b of the battery cell 10 while the first window 31a accommodates the cell body part 12a of the battery cell 10, whereby the first seating part 31 supports the cell edge part 12b of the battery cell 10 without allowing movement thereof, and reliably fixes the battery cell 10. Likewise, the second seating part 41 is in contact with the cell edge part 12b of the battery cell 10 while the second window 42a accommodates the cell body part 12a of the battery cell 10 whereby the second seating part 41 supports the cell edge part 12b of the battery cell 10 without allowing movement thereof, and reliably fixes the battery cell 10.

FIG. 4 is an exploded perspective view showing a battery module in which the battery cell assemblies of FIG. 1 are stacked.

One or more battery cell assemblies 1 according to the present invention are inserted to slots 210 of the battery base 200 in directions perpendicular to the base 200. Thus, the one or more battery cell assemblies 1, namely a sub-battery module, are electrically connected to each other in series and/or parallel on the base 200, and form a mid-to-large battery module 100.

In the battery cell assembly 1 according to the present invention, the first bonding part 33 and the second bonding part 43 that are bonded together are inserted into a slot 210 of the base 200, thus the battery cell assembly 1 is easily mounted on the base 200. Preferably, the slot 210 may be formed with a width equal to thickness of a bonded part of the first bonding part 33 and the second bonding part 43, and prevents movement of elements in the battery cell assembly 1 after insertion.

Figure 5:
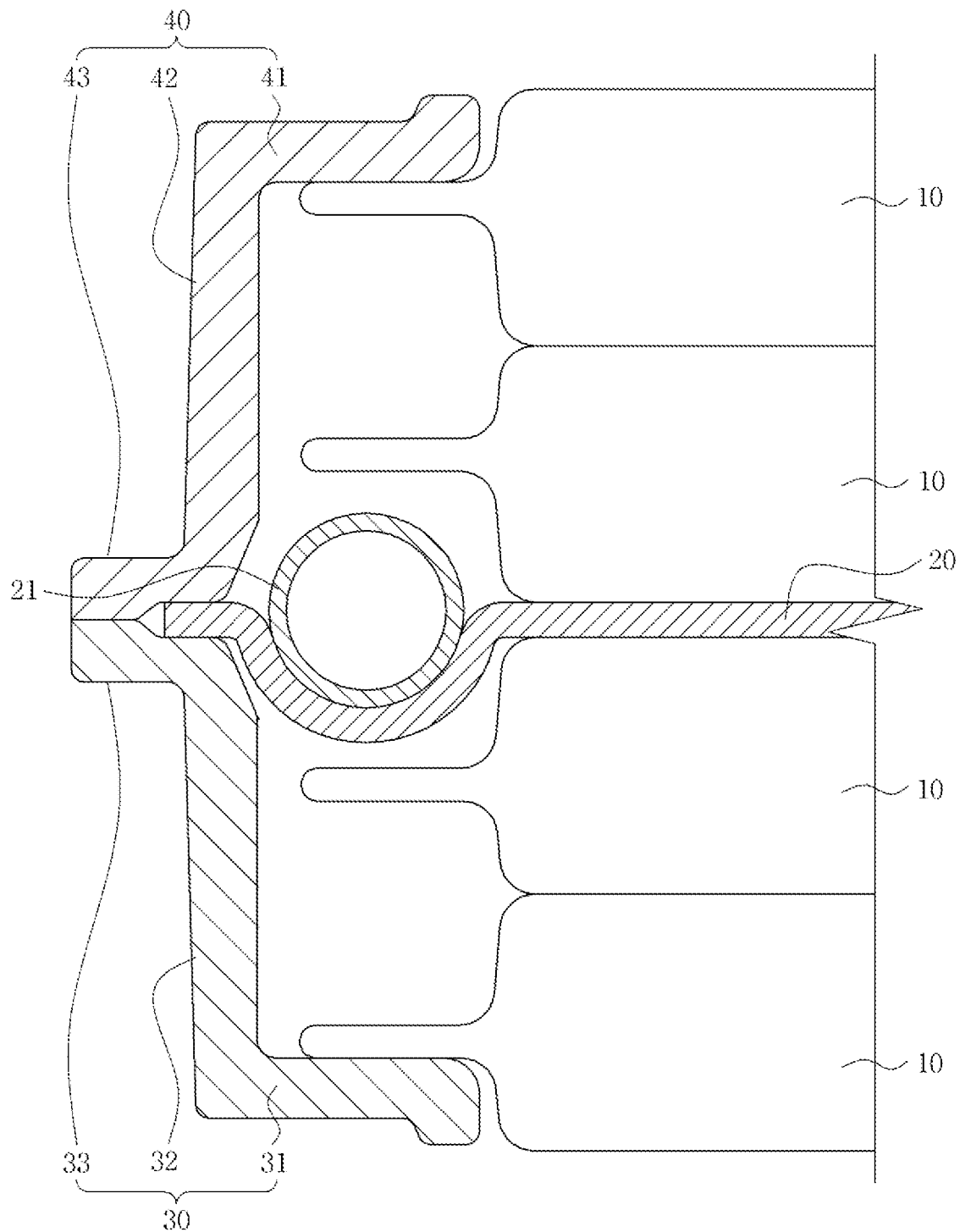
FIG. 5 is a partial cross-sectional view showing a battery cell assembly according to another embodiment of the present invention.

FIG. 5 is a partial cross-sectional view showing a battery cell assembly 1 according to another embodiment of the present invention.

FIGS. 1 to 3 show a battery cell assembly 1 that contains two battery cells 10, but is not limited thereto. In other words, in the present invention, the battery cell assembly 1 may contain two or more battery cells 10 if necessary.

More specifically, the battery cell assembly 1 according to another embodiment illustrated in FIG. 5 contains four battery cells 10. Of course, the number of the battery cells of the battery cell assembly 1 according to the present invention may be changeable so as to supply desired electric voltage or electric current without being limited to two or four shown in FIGS. 1 and 5.

In the battery cell assembly 1 according to the embodiment of the present invention of FIG. 5, the length of the first bending part 32 of the first frame 30 and the length of the second bending part 42 of the second frame 40 are increased so as to fix four battery cells 10 between the first frame 30 and the second frame 40.

Figure 6:
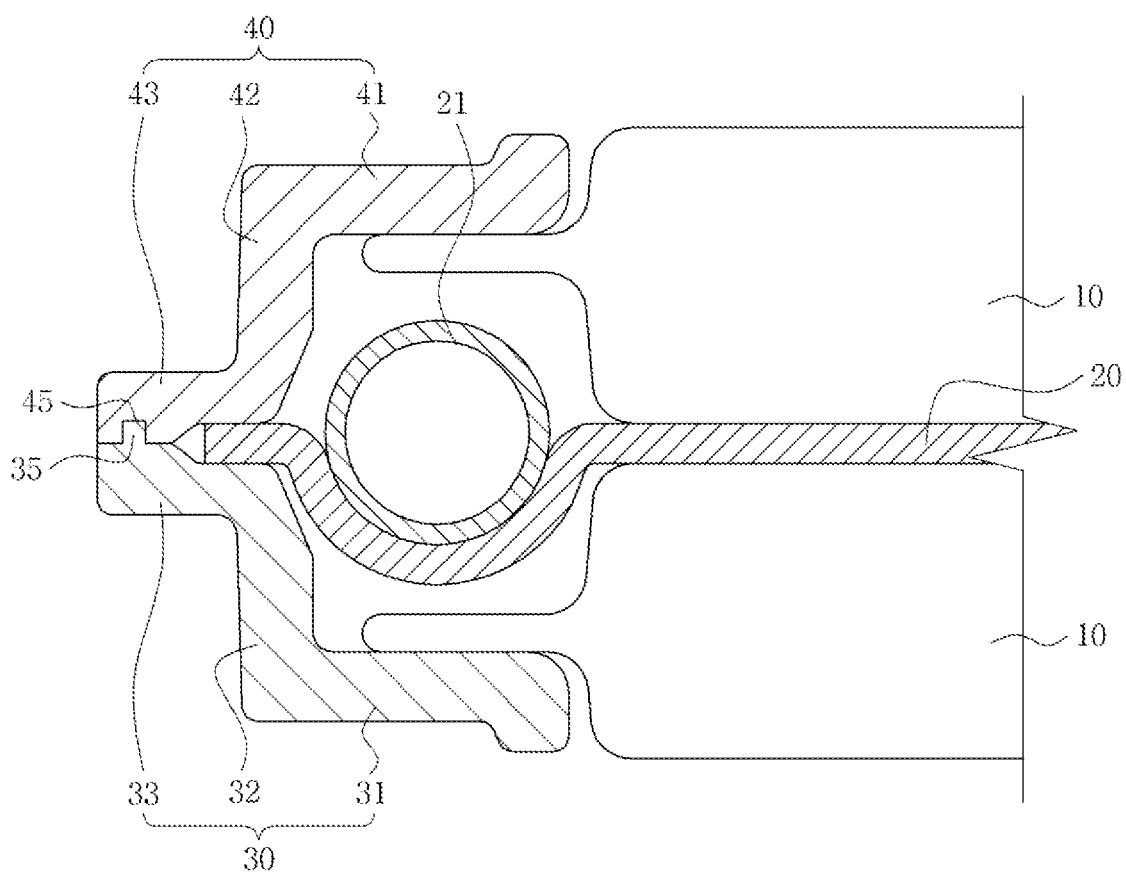
FIG. 6 is a partial cross-sectional view showing a battery cell assembly according to a further embodiment of the present invention.

FIG. 6 is a cross-sectional view showing a battery cell assembly 1 according to a further embodiment of the present invention.

Since the configuration of the battery cell assembly 1 illustrated in FIG. 6 is similar to that of the battery cell assembly 1 illustrated in FIG. 1 except for shapes of the first bonding part 33 and the second bonding part 43, descriptions of the same or like parts will be omitted herein for better understanding of the present invention.

As shown in FIG. 6, a protrusion 35 may be formed on any one of the first bonding part 33 and the second bonding part 43, and a groove 45 may be formed on a remaining one of the first bonding part 33 and the second bonding part 43. In the embodiment of present invention, the first bonding part 33 is provided with the protrusion 35 that protrudes on a flat surface facing the second bonding part 43 in a direction perpendicular to the second bonding part 43, and the second bonding part 43 is provided with the groove 45 that is formed on a flat surface facing the first bonding part 33 at a location corresponding to the protrusion 35.

Before the first bonding part 33 and the second bonding part 43 are bonded together by a method of laser welding or thermal fusing, the protrusion 35 of the first bonding part 33 is engaged with the groove 45 of the second bonding part 43, thus making easy positioning of the first frame 30 and the second frame 40. In addition, the contact area between the protrusion 35 and the groove 45 is increased, thus improving the coupling strength between the engaged frames 30 and 40.

As described above, in the embodiments of the present invention, the first frame 30 is in close contact with circumferential portions of the front surface of at least one battery cell 10. Further, the second frame 40 is in close contact with circumferential portions of the back surface of the at least one battery cell 10. Accordingly, the frames 30 and 40 efficiently support the edge of the at least one battery cell 10.

Although a few exemplary embodiments of the present invention have been shown and described, it will be appreciated by those skilled in the art that changes may be made in these embodiments without departing from the principles and spirit of the invention.

Therefore, the foregoing embodiments are provided for illustrative purposes only and are not intended to limit the scope of the invention, and therefore changes may be made in these embodiments without departing from the principles and spirit of the invention, the scope of which is defined in the appended claims and their equivalents.

INDUSTRIAL APPLICABILITY

The present invention relates to a battery cell assembly and, more particularly, to a battery cell assembly for a secondary battery, namely a frame type sub-battery module. The present invention has industrial applicability in the fields of manufacturing and application of a battery module due to improved structural stability and parts reliability.

The invention claimed is:

1. A battery cell assembly for a secondary battery, the assembly comprising:
   two or more battery cells, each of the two or more battery cells including a cell body part and a cell edge part formed along the periphery of the cell body part;
   a first frame having an interior surface facing the two or more battery cells and an exterior surface facing away from the two or more battery cells, the first frame is provided with: a first seating part including a first window at a center inside thereof and being contacted with the cell edge part of a foremost battery cell of the two or more battery cells, a first bending part extending from an edge of the first seating part toward a second frame, and a first bonding part extending from an edge of the first bending part and protruding from the exterior surface of the first frame away from the two or more battery cells; and the second frame having an interior surface facing the two or more battery cells and an exterior surface facing away from the two or more battery cells, the second frame is provided with: a second seating part including a second window at a center inside thereof and being contacted with the cell edge part of a rearmost battery cell of the two or more battery cells, a second bending part extending from an edge of the second seating part toward the first frame, and a second bonding part extending from an edge of the second bending part, protruding from the exterior surface of the second frame away from the two or more battery cells, and directly coupled to the first bonding part, wherein the first frame and the second frame are coupled to each other by being in surface contact with each other.

2. The battery cell assembly for the secondary battery of claim 1, wherein the first frame and the second frame include plastic that is able to be bonded by welding.

3. The battery cell assembly for the secondary battery of claim 1, wherein the first bonding part and the second bonding part are in surface contact with each other.

4. The battery cell assembly for the secondary battery of claim 1, wherein the first bonding part is provided with a first stepped portion that is formed on a junction between the first bonding part and the first bending part, and the second bonding part is provided with a second stepped portion that is formed on a junction between the second bonding part and the second bending part.

5. The battery cell assembly for the secondary battery of claim 1, wherein the first bonding part is additionally provided with a protrusion that protrudes in a perpendicular manner, and the second bonding part is additionally provided with a groove that is indented in a perpendicular manner.

6. The battery cell assembly for the secondary battery of claim 3, wherein the first bonding part and the second bonding part are fixed by laser welding.

7. The battery cell assembly for the secondary battery of claim 3, wherein the first bonding part and the second bonding part are bonded to each other by thermal fusing.

8. The battery cell assembly for the secondary battery of claim 1, wherein a heat dissipation plate is additionally disposed between the two or more battery cells, wherein the heat dissipation plate includes a refrigerant tube along an edge thereof, so that refrigerant tube is disposed to avoid overlapping with a cell body part of each of the battery cells, and the edge of the heat dissipation plate is disposed between a first stepped portion of the first frame and a second stepped portion of the second frame.

9. The battery cell assembly for the secondary battery of claim 8, wherein the heat dissipation plate includes aluminum.

* * * * *